Patented Feb. 25, 1930

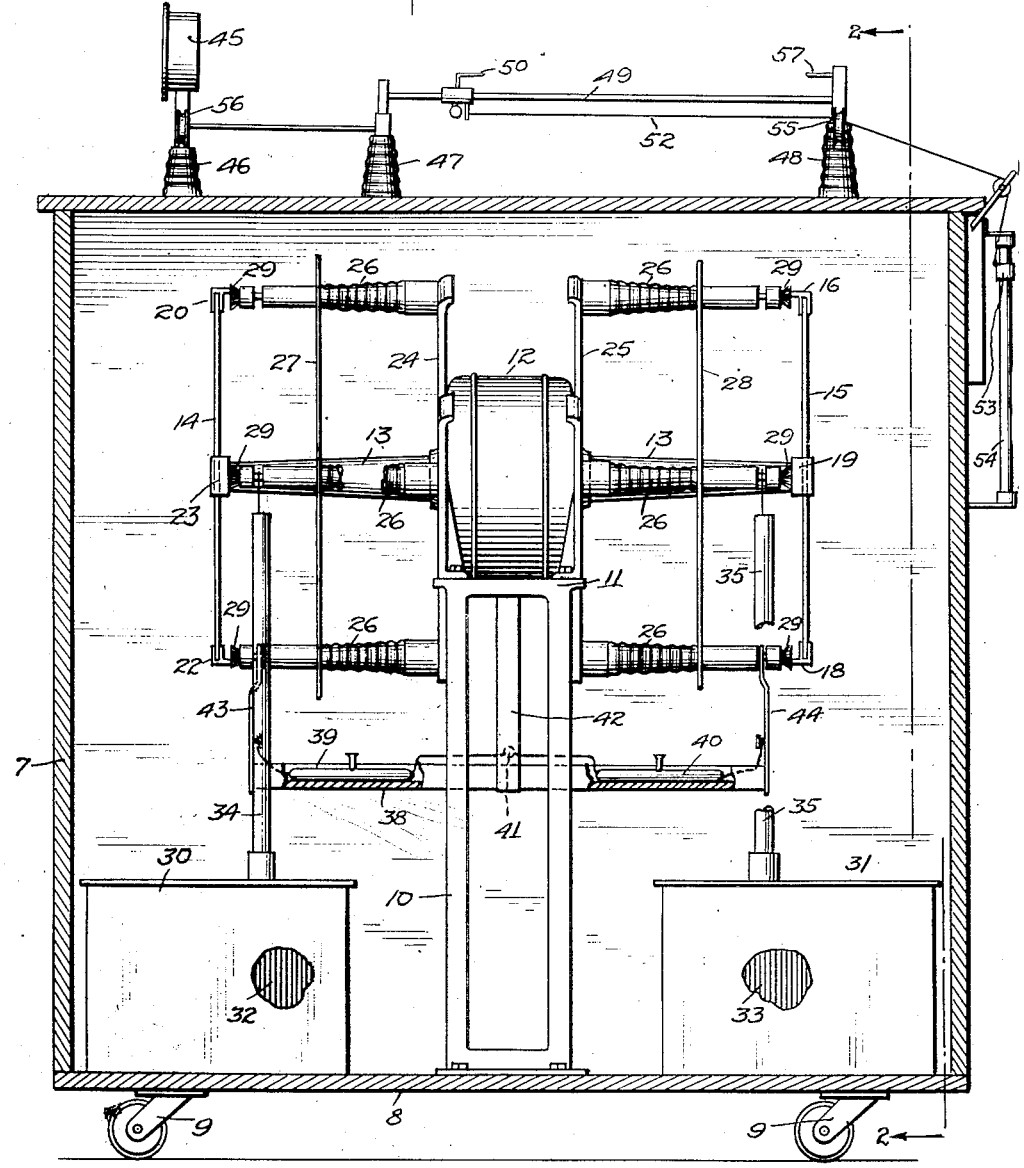

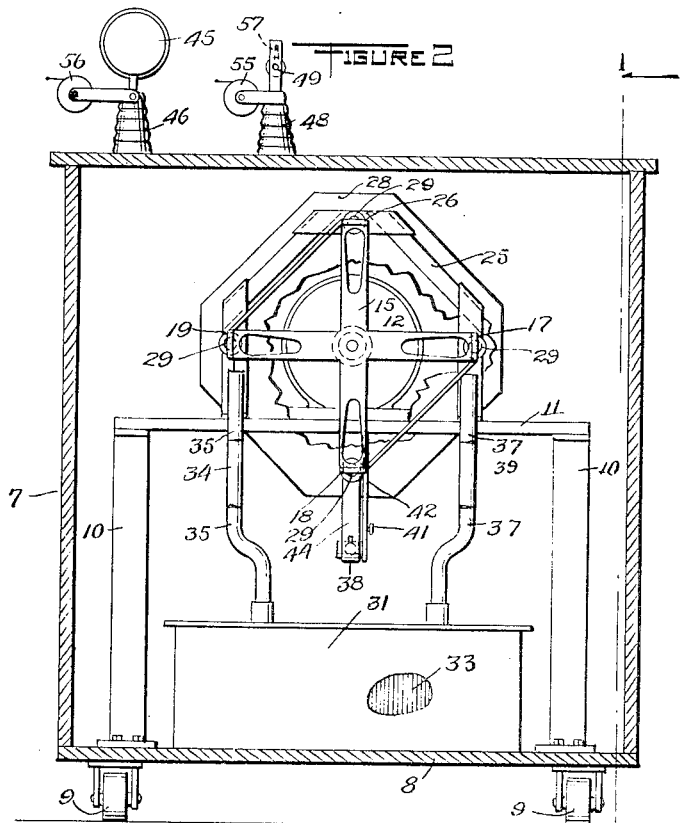

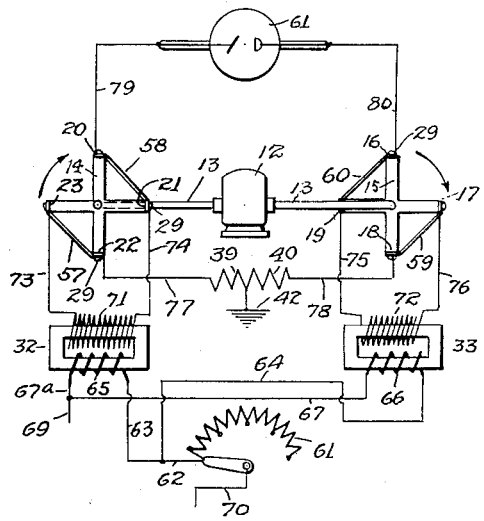
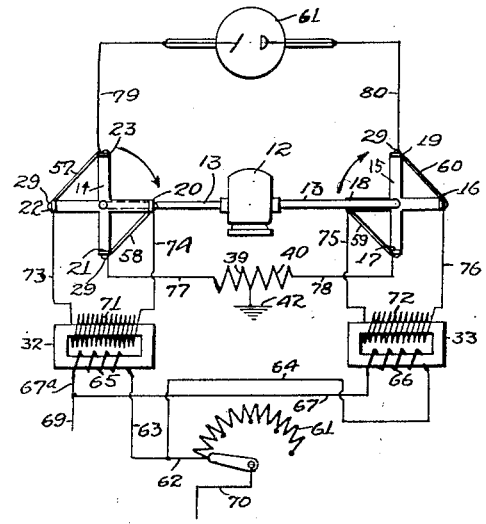
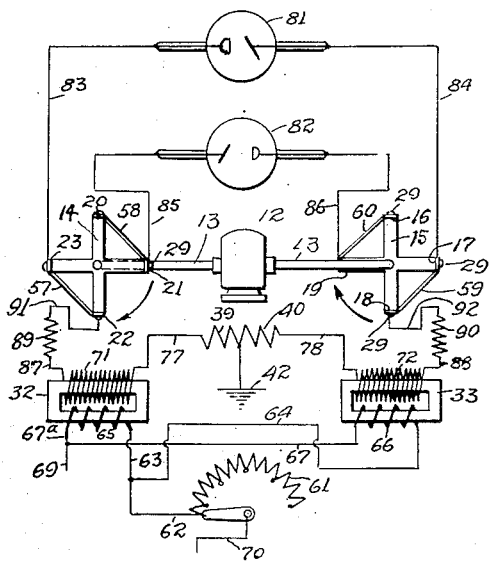
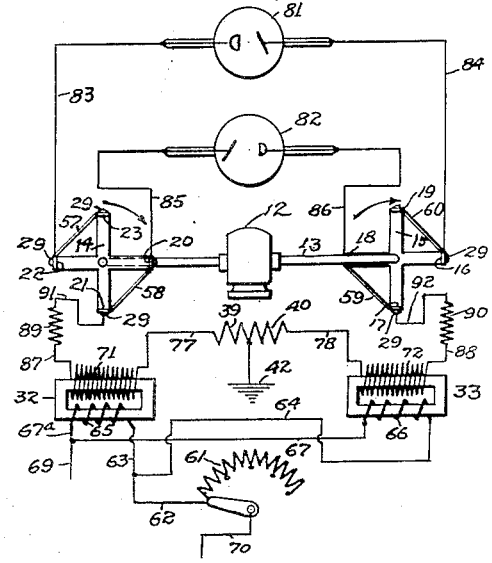

1,748,812

UNITED STATES PATENT OFFICE

REINHOLD H. WAPPLER, OF YONKERS, AND CHARLES FAYER, OF NEW YORK, N. Y., ASSIGNORS TO WAPPLER ELECTRIC COMPANY, INC., A CORPORATION OF NEW YORK

ELECTRIC MACHINE

Application filed November 29, 1921, Serial No. 518,643. Renewed November 30, 1929.

Our invention relates to electrical machines in which current impulses of high potential and of unitary direction are produced, and admits of general use, but is peculiarly adapted for service in connection with the generation of X-rays.

More particularly stated, our invention relates to machines of the general type just mentioned, and in which transformers are used for generating high tension currents, and rotary rectifying switches are employed for giving unitary direction to the successive current impulses.

With rectifying X-ray machines of ordinary type, so designed as to supply currents in which the potential exceeds 100,000 volts, serious difficulties are encountered; and this gives rise to construction which of necessity is complicated, and sometimes dangerous.

By our invention the disadvantages just pointed out are overcome.

Among the objects we seek to accomplish by our invention are the following:

I. By employing more than one rectifying switch, each with its rectifying spider, the individual spiders may each be rendered of smaller diameter than otherwise be the case, and the peripheral speed of each spider can be greatly reduced, so that a smaller motor will suffice to do the work of actuating the rectifying switches.

II. The insulation of the rectifying switches is greatly improved, owing to the fact that each of them is spaced quite a distance from the motor and its connections, and that insulating members of special form are interposed between each rectifying switch and the motor.

III. The transformers are so arranged that each transformer develops only onehalf of the entire voltage of the machine. This renders the insulation much easier and decreases the chances for a breakdown in consequence of high voltage, and yet enables the potential to be rendered very high.

IV. By use of resistances especially arranged and connected, we avoid the production of oscillations, or at least avoid the harmful effects unavoidably set up in connection with the X-ray tubes or analogous parts.

Our invention may be used in connection with either a synchronous motor or a rotary converter, and to this extent may be operated by means of either direct or alternating current, as hereinafter described.

Reference is made to the accompanying drawings forming a part of this specification, and in which like reference characters indicate like parts throughout all of the figures.

Figure 1 is a vertical section through one form of our machine, showing the same as provided with a synchronous motor, and is taken upon the line 1—1 of Figure 2, looking in the direction indicated by the arrows.

Figure 2 is a view of the mechanism appearing in Figure 1, but showing it as partly broken away and as partly a section on the line 2—2 of Figure 1, looking in the direction indicated by the arrows.

Figure 3 is a fragmentary elevation of one of the revoluble spiders forming a part of the machine shown in Figures 1 and 2, and constituting a so-called rectifying disc.

Figure 4 is a section on the line 4—4 of Figure 3, showing a detail of one of the sections carried by the spider shown in Figure 3.

Figure 5 is a diagram showing our machine as used with a rotary converter instead of a synchronous motor, and also showing an X-ray tube and connections leading thereto, so that all of the secondary currents energizing the tube are of unitary direction relatively thereto.

Figure 6 is a diagram showing a single X-ray tube and connections for using the same with the synchronous motor shown in Figures 1 and 2, instead of with the rotary converter shown in Figure 5.

Figure 7 is a diagram showing the same mechanism as Figure 6, but with the rectifying switches as they appear when rotated ninety degrees from the positions indicated for them in Figure 6.

Figure 8 is a diagram of the form of our machine using the synchronous motor, as connected with a pair of X-ray tubes for cross-fire therapy or the like, the X-ray tubes being energized alternately one at a time and each tube being subjected to the maximum voltage which the machine is capable of developing.

Figure 9 is a diagram of the mechanism and connections appearing in Figure 8, but showing the rectifying switches as rotated into positions different from the ones they occupy according to Figure 8.

We will first describe the form of our invention in which a synchronous motor is used, and as shown in Figures 1, 2, 3, and 4.

The casing of the machine appears at 7, and has a floor 8, the latter being provided with castors 9. Located within the casing and secured to the floor 8 are legs 10, made of metal and supporting a base plate 11.

Mounted upon this base plate is a synchronous motor 12, provided with a revoluble armature shaft 13, having the form indicated more particularly in Figure 1. This armature shaft extends in opposite directions a little distance away from the motor, and at its outer ends carries a pair of spiders 14, 15, exactly alike, and each having a form which may be understood from Figures 3 and 4. Each spider is provided with slots 15$^a$ of the form shown in Figure 3, for the purpose of rendering the spiders light, and of improving the insulation. The spider 15 carries four sectors, 16, 17, 18 and 19, and the spider 14 is similarly provided with four sectors 20, 21, 22 and 23.

Connected with the legs 10, and extending upwardly therefrom upon opposite sides of the motor 12, are a pair of frame plates 24 and 25. Mounted upon these frame plates and extending therefrom are insulator pins 26, carrying two discs 27 and 28, made of mica or other appropriate insulating material in sheet form. The purpose of these discs of insulating material is to thoroughly insulate the motor 12 and metallic parts immediately associated therewith from the spiders 14 and 15 and metallic parts carried thereby.

Supported upon the insulator pins 26 are brushes 29, so arranged that the sectors above mentioned make contact periodically with the brushes as the spiders 14 and 15 are turned by the synchronous motor 12.

Mounted within the casing 7 are a pair of transformer boxes 30 and 31, and located within these transformer boxes are two transformers 32 and 33.

Extending upwardly from the transformer box 31 are tubular insulators 34, 35, 36, and 37. A support 38, made of insulating material and having the general form of a trough, is mounted upon the legs 10 and carries a pair of resistances 39 and 40. These resistances are in Figure 1 shown as water resistances, but if desired they may be made of high-resistance carbon, or of carborundum or the like. They are by aid of a connector 41 brought into communication with a grounding plate 42, forming a part of the metallic frame and thus grounded therethrough. This grounding plate is diagrammatically shown as a ground in Figures 5 to 9 inclusive. Electrical connections 43 and 44 serve to connect the resistances 39 and 40 with the brushes 29. The two resistances together constitute a resistor, which is grounded at its mid point.

On top of the casing 7 are a number of auxiliary parts, including an indicator 45, a number of pin insulators 46, 47 and 48, a rod 49 of insulating material, a pair of spark terminals 50 and 51, and a cord 52, controllable by a handle 53. This handle is of annular form and encircles the rod 54. Pulleys 55 and 56 are used in the conventional manner for controlling the lengths of the spark gaps.

From the sector 22 to the sector 23 extends a connector 57, and similarly from the sector 20 to the sector 21 extends a connector 58. A connector 59 extends from the sector 17 to the sector 18, and from the sector 16 a connector 60 extends to the sector 19.

A rheostat 61, of conventional form, is connected by a wire 62 with a wire 63, this wire leading to the primary winding 65 of the transformer 32. The transformer 33 has a primary winding 66, connected by wires 67, 67$^a$ with another primary winding 65, the wires 67, 67$^a$, being joined together and connected to a wire 69.

The wire 69 and the wire 70 leading to the rheostat 61 may be considered as the terminal wires or leads for supplying alternating currents to our machine. The rheostat 61 is preferably, but not necessarily, located outside of the casing 7, and is merely shown diagrammatically in Figures 1 and 2.

The transformer 32 is provided with a secondary winding 71, and the transformer 33 is similarly provided with a secondary winding 72. From the secondary winding 71 two wires 73 and 74 lead to two of the brushes 29. Two other wires 75 and 76 lead from the secondary winding 72 to two more of the brushes 29. The wire 77 is connected with the resistance 39 and leads therefrom to one of the brushes 29, and similarly the wire 78 is connected with the resistance 40 and leads from the same to one of the brushes 29. The wire 79 is connected with one of the brushes 29 and leads therefrom to an X-ray tube 61, this tube being provided with discharge terminals of any form commonly used in this art. Connected with this X-ray tube is another wire 80 which leads to one of the brushes 29.

In some instances, instead of the synchronous motor 12, we use a rotary converter 12$^a$, and change the connections accordingly, as indicated in Figure 5. The shaft of the rotary converter appears at 13$^a$, and carries the two spiders 14, 15. The motor unit of the rotary converter is shown at 12$^b$, and is supplied with direct current by means of two supply wires 12$^c$, 12$^d$. The generator unit of the converter appears at 12$^e$, and supplies alternating currents which are delivered through a pair of wires 12$^f$, 12$^g$. The wire 12$^f$ is connected with the primary winding 65, and by means of the wire 67 is also connected with the primary winding 66. The wire 12$^g$ is connected with the rheostat 61. In other respects the connections are the same for Figure 5 as for Figures 6 and 7.

The various parts arranged as indicated in Figures 5, 6, and 7 are shown as used for energizing the single X-ray tube 61 instead of being arranged to energize two X-ray tubes as illustrated in Figures 8 and 9, and as hereinafter described.

When the single tube only is to be energized, in the manner indicated in Figures 6 and 7, for each complete cycle of the alternating current used for energizing the X-ray tube, two pulsations of high tension current are passed in succession through the single tube, both in the same direction. According to Figures 6 and 7, this direction is from left to right. This means, of course, that the rectifying switches, comprising the revoluble spiders 14 and 15 and various parts immediately associated therewith, are so actuated by the synchronous motor 12 as to rectify the secondary currents and send them successively in the same direction through the X-ray tube.

We find that by the use of the resistances 39 and 40 and the ground 42 connected between them, we can prevent undesirable oscillations from being set up by the currents passing through the tube and through the secondary windings.

As is well known in this art, it is quite common to develop oscillations in connection with the use of an X-ray tube. Sometimes the development of oscillations is desirable, and at other times it is harmful. In many instances the development of oscillations is purely accidental. For our purpose, however, we consider oscillations as objectionable because they tend to shorten the lifetime of the X-ray tubes, and further because they increase the danger of a breakdown; and also, in some instances, they cause the X-ray tube to act abnormally.

Our idea, therefore, is to prevent the occurrence of oscillations. This we do in the manner indicated, by inserting the resistances 39 and 40 and by grounding the circuit between these resistances, as shown. Thus we prevent oscillations by use of a resistor, with its mid point grounded.

When our invention is used with the rotary converter 12$^a$, as indicated in Figure 5, the circuits are to some extent different than when our invention is used with the synchronous motor 12.

With the rotary converter 12$^a$, used as indicated in Figure 5, the direct current circuit used for energizing the direct current unit 12$^b$, may be traced as follows: source (not shown) of direct current, wire 12$^c$, direct current unit 12$^b$, and wire 12$^d$, back to source. The current supplied through the circuit just traced energizes the direct current unit 12$^b$, and thus drives the converter.

A circuit through the primary winding 66 may be traced as follows: alternating current unit 12$^e$ of the rotary converter 12$^a$, wire 12$^g$, rheostat 61, wire 62, wire 64, primary winding 66, wire 67, wire 12$^f$, back to alternating current unit 12$^e$. A circuit through the primary winding 65 may be traced as follows: alternating current unit 12$^e$, wire 12$^g$, rheostat 61, wire 62, wire 63, primary winding 65 and wire 12$^f$, back to alternating current unit 12$^e$. Thus the two primary windings 65 and 66 are energized in parallel with each other; and, of course, in synchronism with each other and with the successive positions assumed periodically by the spiders 14 and 15 as they rotate.

When our invention is used with the synchronous motor 12 and a single X-ray tube 61, as indicated in Figure 6, a circuit for energizing the primary windings may be traced as follows: source of power (not shown) wire 70, rheostat 61, wire 62, wire 64, primary winding 66, wire 67, wire 69, back to source of power. This source also energizes the primary winding 65. Thus the two primary windings 65 and 66 are energized in parallel with each other; and of course, in synchronism with each other and with the synchronous motor 12.

A high tension circuit through the single tube 61 may be traced in Figure 6, as follows: secondary winding 71, wire 74, sector 21, connector 58, sector 20, wire 79, X-ray tube 61, wire 80, sector 16, connector 60, sector 19, wire 75, secondary winding 72, wire 76, sector 17, connector 59, sector 18, wire 78, resistances 40 and 39, (grounded on the frame 42), wire 77, sector 22, connector 57, sector 23, and wire 73 back to secondary winding 71. This circuit includes the two secondary windings 71, 72 in series with each other and with the X-ray tube 61, and causes a discharge to take place through the tube in the direction above mentioned.

When the rotation of the armature shaft 13, in the direction indicated for it by arrows in Figure 6, shifts the position of the spiders 14 and 15 so as to turn each of them 90 degrees, or in other words when each of the spiders 14 and 15 makes a quarter of a turn from its position indicated in Figure 6 and thus assumes a new position as indicated in Figure 7, a secondary circuit may be traced on Figure 6 as follows: secondary winding 71, wire 74, sector 20, connector 58, sector 21, wire 77, resistances 39 and 40, (grounded at 42), wire 78, sector 17, connector 59, sector 18, wire 75, secondary winding 72, wire 76, sector 16, connector 60, sector 19, wire 80, X-ray tube 61, wire 79, sector 23, connector 57, sector 22, and wire 73 back to secondary winding 71. The circuit just traced includes the secondary windings 71 and 72 in series with each other and with the X-ray tube 61; and owing to the change in phase of the current the direction of the discharge through the tube is the same relatively to the tube as that which had just taken place in the other circuit last above traced.

Thus it will be seen that each change in phase in the current used for energizing the system and for driving the motor is inherently associated with a switch reversal in the direction of the secondary current, so that each secondary current pulsation always passes through the X-ray tube in the same direction relatively to the tube.

The sectors 16 and 23 are each relatively short, for the purpose of opening and closing the secondary circuit at the precise instants when the secondary voltage is at its maximum; or, as the action is sometimes stated in a popular way, the sectors are so proportioned and arranged as to pick out the potential peaks. With this arrangement, the X-rays produced are very hard.

As shown in Figures 8 and 9 we can employ two X-ray tubes 81 and 82, so connected and arranged that they are energized one at a time; but when either of them is energized it is subjected to the maximum potential of the machine. In other words when either tube is energized at all it is energized by a current including the two secondary windings 71 and 72 in series. For this purpose the connections are arranged somewhat differently than as shown in Figures 6 and 7.

An X-ray tube 81 is by means of wires 83 and 84 connected with two of the brushes 29. Similarly, the X-ray tube 82 is by two wires 85 and 86 connected with two more of the brushes 29. Connected with the secondary windings 71 and 72 are two wires 77 and 78, and connected with these wires are two resistances 89 and 90, which may be of the kind above designated as 39, 40. From the resistance 89 a wire 91 leads to a brush 29, and from the resistance 90 the wire 92 leads to another one of the brushes 29.

The primary windings 65 and 66 are energized in the manner above described with reference to Figure 3, the secondary windings 71 and 72 being energized inductively by the action of the transformers 32 and 33.

With the various movable parts in the positions indicated for them in Figure 8, a secondary circuit may be traced as follows: secondary winding 71, wire 77, resistance 39, 40 (grounded at 42), wire 78, secondary winding 72, wire 88, resistance 90, wire 92, sector 18, connector 59, sector 17, wire 84, X-ray tube 81, wire 83, sector 23, connector 57, sector 22, wire 91, resistance 89, and wire 87 back to secondary winding 71. By virtue of the circuit just traced the X-ray tube 81 is subjected to the potential due to the two secondary windings 71 and 72 connected for the moment in series with each other and with the X-ray tube; and that, too, when the potential thus developed is at its peak.

When each of the revoluble spiders 14, 15 is rotated ninety degrees from the position indicated for it in 8 and is thus brought into the position indicated for it in Figure 9, a secondary circuit may be traced as follows: secondary winding 71, wire 77, resistances 39, 40, wire 78, secondary winding 72, wire 88, resistance 90, wire 92, sector 17, connector 59, sector 18, wire 86, X-ray tube 82, wire 85, sector 20, connector 58, sector 21, wire 91, resistance 89, and wire 87, back to secondary winding 71.

The circuit just traced, it will be noted is through the two secondary windings 71 and 72, in series with each other and through the X-ray tube 82, and the direction of the current relatively to the X-ray tube 82, is the same as the direction of the current in the circuit last above traced, relatively to the X-ray tube 81.

Thus with two X-ray tubes 81 and 82, as shown in Figures 8 and 9, first there is a discharge at the maximum potential through one of the tubes, and then a discharge at the maximum potential through the other tube, the discharge through each tube being always in the same direction relatively to the tube, as regards the location of its anode and cathode.

Our apparatus in connection with two X-ray tubes 81, 82, as indicated for example in Figures 8 and 9, may be used in more than one way. In some instances we use it in such manner that one of the X-ray tubes is used upon one patient, the other X-ray tube being used upon a different patient. In other instances both of the X-ray tubes may be used upon same patient. A good way to use both of the tubes upon the same patient is to arrange the two tubes so that the X-rays from one tube are projected through the patient's body at a substantially different angle than is the case with the X-rays projected from the other of the tubes—the two sets of rays, one from each tube, reaching the same part of the patient's body. This manner of directing the X-ray from two tubes and projecting the two sets of rays from different angles to the same part of the patient's body is known as cross-firing, and is commonly used in the treatment of cancer. It has a great advantage, namely, that it avoids the necessity for sending all of the X-rays through a particular portion of the patient's skin and the superficial tissues adjacent thereto. It is obvious that with two tubes arranged for cross-firing, so that two distinct sets of X-rays are each projected to substantially the same point in the patient's body, a given portion of the patient's skin, where subjected to the action of the rays, is exposed to only one-half of harmful effects of the rays as compared with a condition in which a single tube only is used.

The purpose of the resistances 39, 40, and also of the resistances 89, 90 when the latter are used, is to prevent oscillations taking place through the X-ray tube or tubes employed. The resistances 39, 40 are always used, and are grounded as shown in the drawing and as above described, at a point between them. The resistance 89, 90 may be employed or not, as the operator may desire. The various resistances may, be supported in any convenient manner.

As is well known in this art, the development of oscillations is dependent upon the relations of inductance, resistance and capacity—these three factors being usually designated as the constants. In order for oscillations to develop in a circuit of the general kind here contemplated, it is essential that the ohmic resistance of the circuit be relatively low. Therefore, by the insertion of the resistances just mentioned, the ohmic resistance of the circuit through the X-ray tube is rendered sufficiently high to prevent development of the oscillations. Care should be exercised, of course, to see that the ohmic resistance is sufficiently high, as compared with the inductance and capacity of the circuit, to accomplish this result. We find that by grounding the circuit at a point intermediate the resistances, the circuit is rendered more symmetrical than would otherwise be the case; and that, as a consequence, the action of the tube is improved. It follows, too, that by this arrangement, since the ground is always at zero potential, the voltage at any particular moment developed in the secondary circuit will be one-half above, and one-half below, zero. Such being the case the maximum potential which can ever be developed, relatively to the terminals of the tube, is virtually reduced one-half, in so far as danger to the operator or to the mechanism is concerned, or in so far as the insulation of the circuit may be a problem. It follows as a corallary that, for a given strength of insulation, the potential may be practically double without danger of a break-down.

As may be seen from the foregoing description, the synchronous motor used in connection with our device may be smaller than usual, other factors being equal, for the reason that by using two spiders 14, 15, of small size and thus in decreasing the necessity for peripheral speed in each spider, the result obtained is as good as that ordinarily obtained by the use of a single large disc operated at a high speed. Again, the construction of each of these spiders 14 and 15 is such that there are large open spaces between the successive sectors, and because of this fact the insulation is rendered better.

The arrangement of the transformers is such that each transformer develops only one-half of the total voltage. Because of this fact, the insulation of the transformers and parts immediately adjacent thereto is rendered easier and thus to some extent simplified.

The X-ray tubes shown are merely typical as our device may be used with X-ray tubes of any kind, such for instance as gas tubes and high vacuum electronic tubes of various kinds, including tubes of the so-called Coolidge and Lilenfeld types. Our device may also be used for other purposes not associated with vacuum tubes of any kind, but in which it is desirable to employ high tension current pulsations of one direction.

We do not limit ourselves to the precise arrangement shown, as variations may be made therein without departing from our invention, which is commensurate with our claim.

Having thus described our invention, what we claim as new and desire to secure by Letters Patent is as follows:

In an electric machine, the combination of a prime mover provided with a revoluble shaft extending from it in opposite directions, a pair of mechanical rectifiers connected with the ends of said shaft and thus spaced apart, said mechanical rectifiers being driven by rotation of said shaft, a pair of high tension transformers spaced apart and disposed adjacent said rectifiers, and connections joining said transformers in series through said rectifiers, said connections including a resistor having its mid point grounded.

REINHOLD H. WAPPLER.
CHARLES FAYER.